(12) United States Patent
Abadia et al.

(10) Patent No.: US 7,224,093 B2
(45) Date of Patent: May 29, 2007

(54) POLYPHASE ELECTRIC ROTARY MACHINE

(75) Inventors: Roger Abadia, Neuilly-Plaisance (FR); Jean-Marc Dubus, Evry (FR); Serge Masriera, Lyons (FR)

(73) Assignee: Valeo Equipements Electriques Moteur, Creteil (FR)

( * ) Notice: Subject to any disclaimer, the term of this patent is extended or adjusted under 35 U.S.C. 154(b) by 577 days.

(21) Appl. No.: 09/959,805

(22) PCT Filed: Mar. 9, 2001

(86) PCT No.: PCT/FR01/00709

§ 371 (c)(1),
(2), (4) Date: Nov. 7, 2001

(87) PCT Pub. No.: WO01/69762

PCT Pub. Date: Sep. 20, 2001

(65) Prior Publication Data
US 2002/0158523 A1 Oct. 31, 2002

(30) Foreign Application Priority Data
Mar. 10, 2000 (FR) .................................. 00 03131

(51) Int. Cl.
*H02K 11/00* (2006.01)
(52) U.S. Cl. .................... 310/68 B; 310/71; 310/241
(58) Field of Classification Search ............. 310/68 B, 310/241, 242, 243, 71, 49 A; 324/200, 207.2–25
See application file for complete search history.

(56) References Cited

U.S. PATENT DOCUMENTS

| | | | | |
|---|---|---|---|---|
| 2,184,236 A | * | 12/1939 | Heintz | 290/31 |
| 4,313,411 A | * | 2/1982 | Moriyama et al. | 123/445 |
| 4,430,603 A | | 2/1984 | Muller | 290/31 |
| 4,492,906 A | * | 1/1985 | Goto et al. | 310/68 B |
| 4,642,496 A | * | 2/1987 | Kerviel et al. | 310/68 B |
| 4,720,638 A | * | 1/1988 | Vollbrecht | 290/38 R |
| 4,785,242 A | * | 11/1988 | Vaidya et al. | 324/207.25 |
| 4,797,602 A | * | 1/1989 | West | 322/10 |
| 4,894,553 A | | 1/1990 | Kaneyuki | 701/70 |
| 4,952,830 A | * | 8/1990 | Shirakawa | 310/68 B |
| 4,955,944 A | * | 9/1990 | Aso et al. | 123/41.31 |
| 4,982,125 A | * | 1/1991 | Shirakawa | 310/88 |
| 5,103,127 A | | 4/1992 | Peter | 310/113 |
| 5,239,218 A | * | 8/1993 | Hashimoto et al. | 310/68 B |

(Continued)

FOREIGN PATENT DOCUMENTS

| | | | |
|---|---|---|---|
| EP | 0 610 767 A | | 8/1994 |
| FR | 2568377 A | * | 1/1986 |
| JP | 60 257754 A | | 12/1985 |
| JP | 61 154463 A | | 7/1986 |
| JP | 02 197245 A | | 8/1990 |
| JP | 09 065620 A | | 3/1997 |
| JP | 09065620 A | * | 3/1997 |

*Primary Examiner*—Thanh Lam
(74) *Attorney, Agent, or Firm*—Berenato, White & Stavish

(57) ABSTRACT

The electric machine includes a front end plate (13), a rear end plate (14), a rotor (4) installed between the said end plates, and a magnetic target (50) with axial or radial reading fixed onto a target holder installed between the rotor (4) and one of the said end plates.

39 Claims, 9 Drawing Sheets

U.S. PATENT DOCUMENTS

| | | |
|---|---|---|
| 5,552,988 A | 9/1996 | Kawaguchi et al. ...... 310/68 B |
| 5,831,358 A * | 11/1998 | Bobay ..................... 310/68 B |
| 5,877,568 A * | 3/1999 | Maes et al. ............... 310/68 B |
| 5,932,942 A * | 8/1999 | Patyk et al. .............. 310/68 B |
| 5,939,807 A * | 8/1999 | Patyk et al. .............. 310/68 R |
| 6,020,660 A * | 2/2000 | Wright ..................... 310/68 B |
| 6,054,818 A * | 4/2000 | Tabata et al. ................ 318/139 |
| 6,137,288 A * | 10/2000 | Luetzow .................. 324/207.2 |
| 6,153,957 A * | 11/2000 | Takano ........................ 310/71 |
| 6,522,130 B1 * | 2/2003 | Lutz ......................... 324/207.2 |
| 6,538,429 B2 * | 3/2003 | Schroeder et al. ........ 310/68 B |
| 6,680,553 B1 * | 1/2004 | Takano ..................... 310/68 B |

* cited by examiner

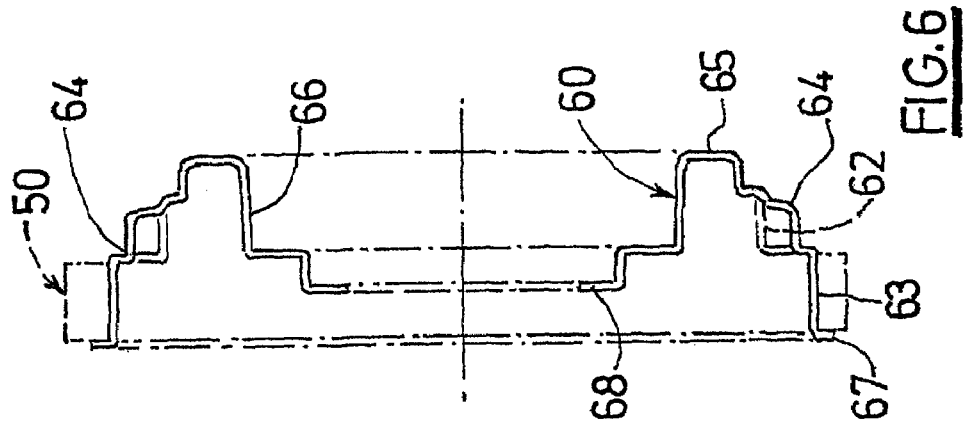
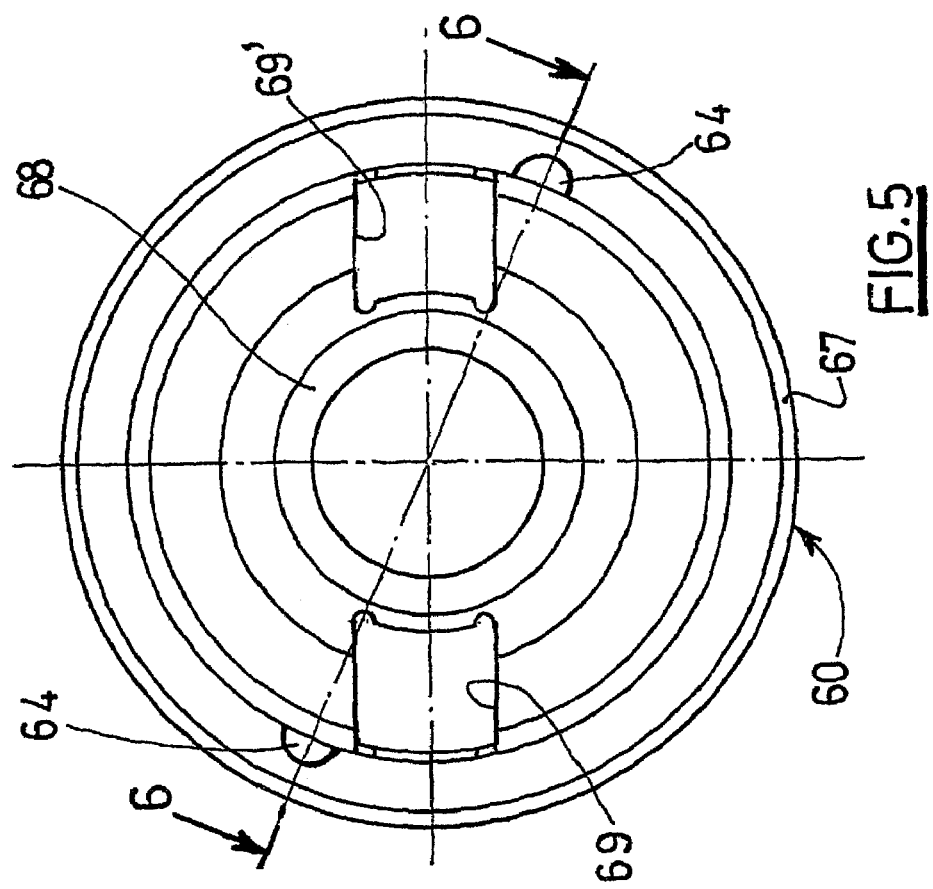

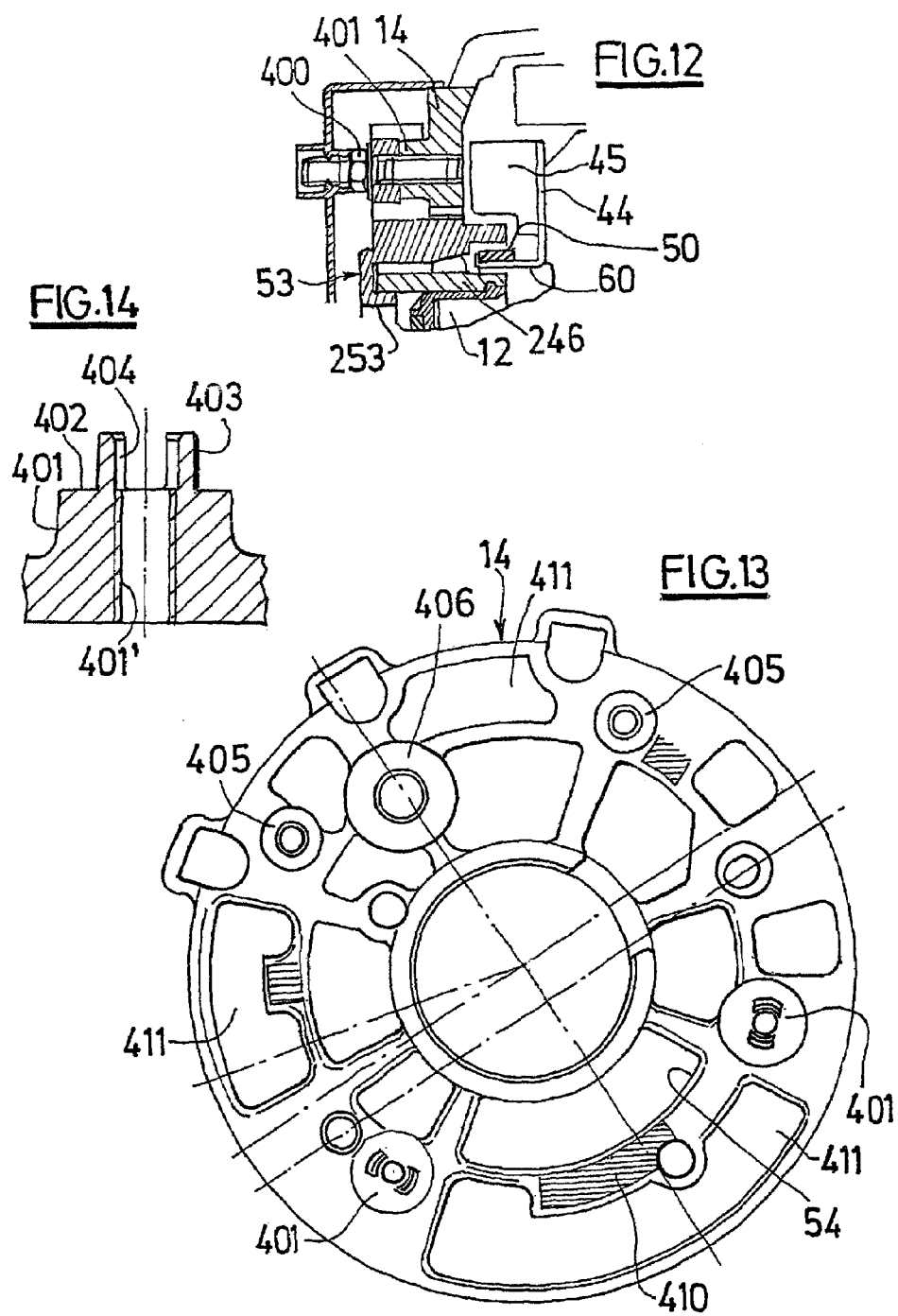

POLYPHASE ELECTRIC ROTARY MACHINE

The present invention relates to a multi-phase rotating electric machine able to be used in a motor vehicle with an internal-combustion engine, on the one hand, as an electrical generator for carrying out an alternator function and, on the other hand, as an electric motor especially for carrying out a function of starting of the internal-combustion engine of the vehicle.

Such a machine, of the reversible type, makes it possible to convert mechanical energy into electrical energy and vice versa, and includes a multi-phase stator surrounding a rotor.

This rotating electric machine is usually called "alternator/starter".

The multi-phase nature requires tracking of the angular position of the rotor with the aid of tracking means for control in electric-motor mode so as to inject electric current at the correct moment into the phase winding in question of the winding of the stator as described, for example, in the document FR-B-2 745 444 and EP-A-0 260 176. These tracking means are of the magnetic type.

An instrumented ball bearing can be used for this tracking.

Such a solution is expensive and can prove to be prohibitive considering the overall size of the rotating electric machine.

Nevertheless it is advantageous, since it makes it possible to be able to carry out tracking of the angular position of the rotor for high rotational speeds.

It is therefore an object of the invention to propose a multi-phase rotating electric machine able to be used as an electrical generator and as an electric starter motor, and which includes means which are compact, economical and effective at high rotational speeds of the rotor for tracking the rotation of the rotor of the said machine.

According to the invention, a rotating electric machine of the type indicated above including a hollow support equipped with a front end plate and with a rear end plate which are linked together and each centrally possessing a bearing means traversed by the extremity of a shaft carrying a rotor with magnetic poles surrounded by a multi-phase stator carried internally by the support and in which means for tracking the rotation of the rotor of the magnetic type are provided and include at least one sensor associated with a target, is characterised in that the target is a target with axial or radial reading, in that the target is fixed onto a target holder locked in rotation onto the rotor and installed axially between the rotor and one of the front or rear end plates while being adjacent to it, and in that the front or rear end plate adjacent to the target holder carries the sensor detecting the passing of the magnetic target.

In one embodiment, the target is a magnetic target and advantageously includes a number of pairs of magnetic poles which is identical to that of the rotor of the electric machine, while, facing this target, three Hall-effect or magneto-resistive sensors for better tracking are preferably fixed to the end plate in question, the sensors being of the magnetic type.

These sensors, in one embodiment, are of the threshold type configured to take two values as described in the document EP-A-0 260 176.

The target holder may be of a magnetic or non-magnetic nature. The nature of the material constituting the target may be ferrites, rare earths or include only inert sectors made of magnetic sheet metal in which fluxes are set up by the rotor magnetic field. The target can be castellated.

In general, the tracking means are set up in such a way as to optimise the starting torque and to make it possible, according to the invention, to carry out tracking of the rotation of the rotor for high speeds thereof.

By virtue of the invention, a solution is obtained which, while being of high performance, is economical since it relies on the standard components of a conventional, mass-produced alternator.

This solution makes it possible to incorporate the means for tracking the rotation of the rotor within the overall size of a standard alternator without relying on an instrumented ball bearing.

Furthermore, the target is protected since it is positioned between the opposing lateral faces of the rotor and one of the front and rear end plates, without contact with the said end plate.

Advantageously, the end plate in question is the rear end plate since the bearing means, in the form of a ball bearing in the case of a conventional alternator, is of a smaller size such that the target holder, shaped so as not to interfere with the non-rotating ring of the ball bearing, will be of the smallest possible size. Furthermore, the electrical links and the connections are easier to install.

Moreover, a rear cap is mounted on the rear end plate, especially in order to protect the brush holder, such that the said tracking means are better protected and easier to install.

The sensor or sensors are preferably mounted on a sensor holder which is adjustable or fixed in angular terms, installed on the same side as that face of the front or rear end plate in question which is turned away from the rotor.

For example, for an electric machine of the three-phase type, it is possible to rely on three sensors as described in the document EP-0260 176.

The sensor holder is preferably adjustable circumferentially since it is mounted on the end plate in question, while the target and target holder are mounted on the shaft/rotor assembly. It is therefore possible to produce the two subassemblies and to assemble the whole thing at the final stage with an adjustment for overcoming manufacturing tolerances.

This arrangement makes it possible not to increase the overall axial size between the opposing side faces of the rotor and of the front or rear end plate in question.

The sensor or sensors locally pass through the end plate in question by virtue of at least one aperture which the end plate conventionally features. This aperture or these apertures constitute air inlets which makes it possible to carry out cleaning of the gap or gaps between the target and the active part or parts of the sensor or sensors.

This or these active parts are protected, furthermore.

Furthermore, this makes axial reading possible, such that, as in a variant, the sensor or sensors do not necessarily pass through the said aperture or apertures but penetrate at least into them.

In all cases the target is well cooled. This cooling is accentuated, furthermore, by the fan or fans which the rotor carries.

Needless to say, in a variant, the end plate or end plates can also be cooled by water which further promotes a lowering of the temperature, the fan or fans then being axially-acting fans.

In general, the tracking means of the magnetic type according to the invention withstand much higher temperatures than optical-reading tracking means. These means are more reliable and do not risk being dirtied in contrast to optical-reading tracking means.

An electronic control and monitoring module is associated with this machine, as described, for example, in the documents FR-B-2 745 444 and EP-A-0 260 176 mentioned above.

This module includes an alternating-current to direct-current converter, as well as control means receiving information from the tracking means and from the regulation means.

This module is installed, in one embodiment, outside the machine. In a variant it is installed on the support at the outer periphery thereof, especially when the support is water-cooled.

All this frees space in the region of the rear end plate, which is therefore better cooled so that the tracking means are less stressed.

In one embodiment, the target holder is coupled in rotation to the rotor by interlocking shapes.

In order not to modify the rotor and this make the solution more economical, the target holder is coupled via interlocking shapes to the central part of the fan fixed onto the rotor.

The target holder, for example, features studs each engaged in a complementary way in recesses, for example in the form of notches, formed in the annular central part of the fan. The target holder surrounds the wire links of the excitation coil of the rotor to the ring-shaped collector tracks carried by the rear end of the shaft of the rotor.

The target holder is therefore hollow in shape. This target holder features an inner, bush-shaped rim able to come to bear on the inner ring of the ball bearing of the front or rear end plate in question.

Thus the target holder is locked axially, with mounting clearance, between the bearing and the rotor while being coupled in rotation directly or indirectly to the rotor by interlocking shapes.

The mounting of the target holder is thus easy, the target holder not being able to interfere with the end plate in question because of its axial locking. This target holder is a matching piece optimally occupying the available space.

The target holder partly surrounds the outer ring of the ball bearing of the end plate in question as well as the bush which the said end plate features for mounting of the outer ring of the ball bearing.

In one embodiment, this bush, advantageously machined internally, serves as a centring device for the sensor holder, such that a precise gap exists between the sensor holder and the target.

Good reading accuracy and good information transmission to the electronic monitoring and control module are thus obtained.

Thus no interference can occur with the end plate in question. Furthermore, the available space is occupied optimally without increasing the overall size of the machine.

As is revealed by the description, the target holder advantageously has an annular shape and the same goes for the target.

The target holder can be obtained by stamping from sheet metal, such that it can be made from magnetic or magnetisable material.

In a variant, the target holder is a plastic moulded component, such that it is made of non-magnetic material.

In a variant, the target holder is of two materials, and includes a plastic part locked axially on the shaft of the rotor and carrying a metal piece supporting the magnetic target. In a variant, the target holder is of a single piece with the fan which makes it possible to reduce the number of pieces and to retain the maximum number of pieces of a conventional alternator.

This target holder replaces the spacer provided between the ball race of the end plate in question and the rotor. The indexing notches of the fans of the rotor are used to lock the target holder in rotation.

In one embodiment the rear end plate, which the machine includes, features studs each with at least one hollow projection penetrating into an aperture of the sensor holder, or of any other support of a component, for retaining a member for fixing the said component with a view to automatic mounting of the fixing members.

The description which will follow illustrates the invention with regard to the attached drawings, in which:

FIG. 5 is a front view of the target holder;

FIG. 6 is a view in section along the line 6-6 of FIG. 5;

FIG. 12 is a partial view in axial section of the rear part of the machine showing a variant embodiment of the target holder;

FIG. 13 is a front view of the rear face of the rear end plate of FIG. 7;

FIG. 14 is a view in axial section of one of the studs of the rear end plate carrying the sensor holder.

The rotating electric machine, represented in the figures, is reversible and is suitable for converting mechanical energy into electrical energy and vice versa.

This machine consists of an alternator/starter for a motor vehicle with an internal-combustion engine.

Figure 1:
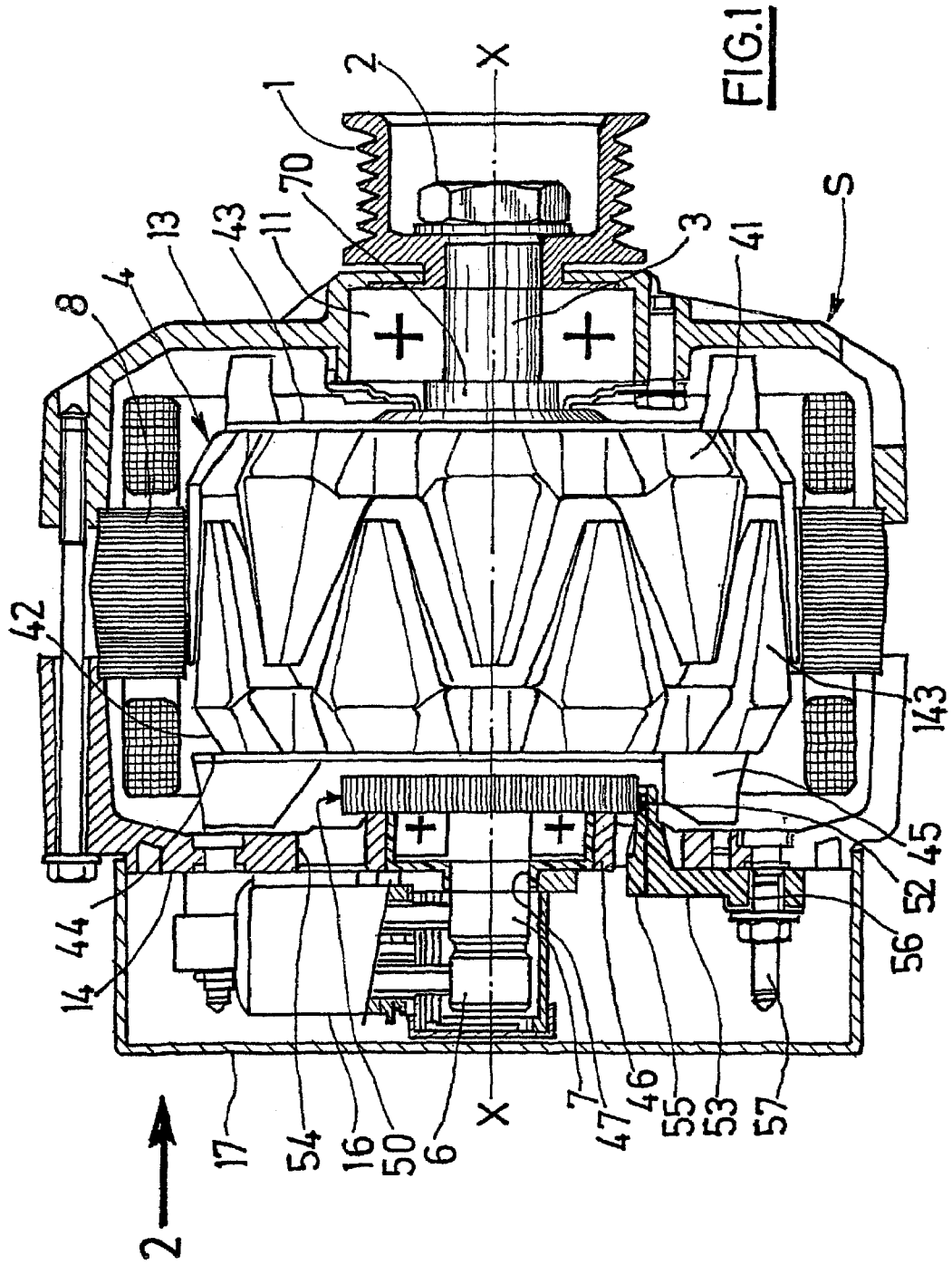
FIG. 1 is a view in axial section of an alternator/starter for a motor vehicle according to the invention, the rotor not being sectioned, as well as the target and the target holder according to the invention.

In the figures, the elements which are identical or similar will be represented by the same reference symbols, the front of the machine corresponding to the right-hand side of FIG. 1 and the back of the machine to the left-hand side of FIG. 1.

The alternator/starter includes a movement-transmission member 1 belonging to a movement-transmission device (not represented) acting between the engine of the vehicle and the machine.

The movement transmission may include gears, chains, variable-spacing pulleys, at least one belt.

Numerous variants can be envisaged, the member 1 therefore possibly having numerous configurations —geared, toothed wheel, pulley, etc.

The member 1 is a driven member, when the machine is operating in current-generator mode (alternator), and a driving member, when the machine is operating as an electric motor (starter), especially in order to start the engine of the vehicle.

In a simple and economical way, the rotating electric machine here has the conventional structure of a three-phase alternator for a motor vehicle, such that the member 1 consists of a pulley which is hollow internally and grooved externally in order to accommodate a belt (not represented) fitted with V-shaped protrusions and belonging to the above-mentioned movement-transmission device. Needless to say, in a variant, the machine includes a larger number of phases.

The pulley 1 features a backplane which is holed centrally and serves as housing for a fixing nut 2 and for a bearing washer (referenced as 200 in FIG. 7) interposed between the nut 2 and the backplane of the pulley 1.

This backplane, of transverse orientation, is traversed centrally by the threaded end of a rotating shaft 3, the axial axis of symmetry X-X of which defines the rotational axis of the machine.

For convenience, the threaded end of the shaft 3 will be called front end, while its other end will be called rear end.

The shaft 3 carries, fixedly, a rotor 4 with mounting teeth provided with an excitation winding 5 the ends of which are linked by wire links to two ring-shaped collector tracks 6, 7 carried by the rear end of the shaft 3. The wound rotor 4 constitutes the inductor associated with the two rings 6, 7 by which the excitation current is led via two brushes linked to a voltage-regulator device particularly protecting the battery of the motor vehicle.

Figure 2:
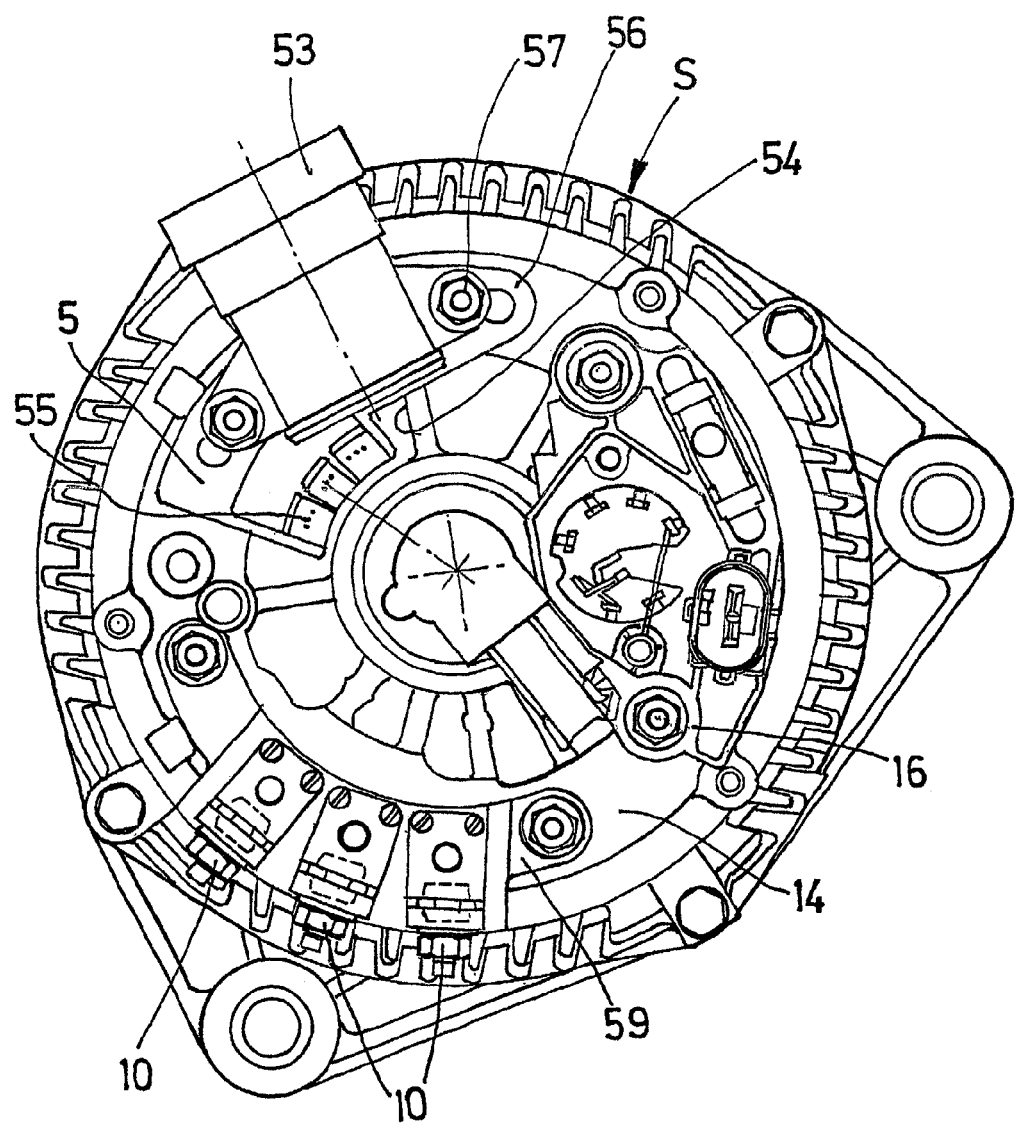
FIG. 2 is a view along the arrow 2 of FIG. 1 without the cap.

The excitation rotor 4 is surrounded by a wound stator 8 here equipped with three windings for defining three phases, the outputs of which can be seen at 10 in FIG. 2. The stator 8 constitutes an armature.

A gap exists between the outer periphery of the rotor 4 and the inner periphery of the stator 8.

In a known way, the stator 8 includes a pack of sheet-metal plates equipped internally with notches for defining a plurality of axial grooves for housing the wires of the windings, the bundles (not referenced) of which can be seen in FIG. 1 extending in axial projection on either side of the stack of sheet-metal plates of the stator 8. Poles exist between the grooves. One or more windings can be provided per phase of the machine.

All this is well known to the person skilled in the art.

Figure 3:
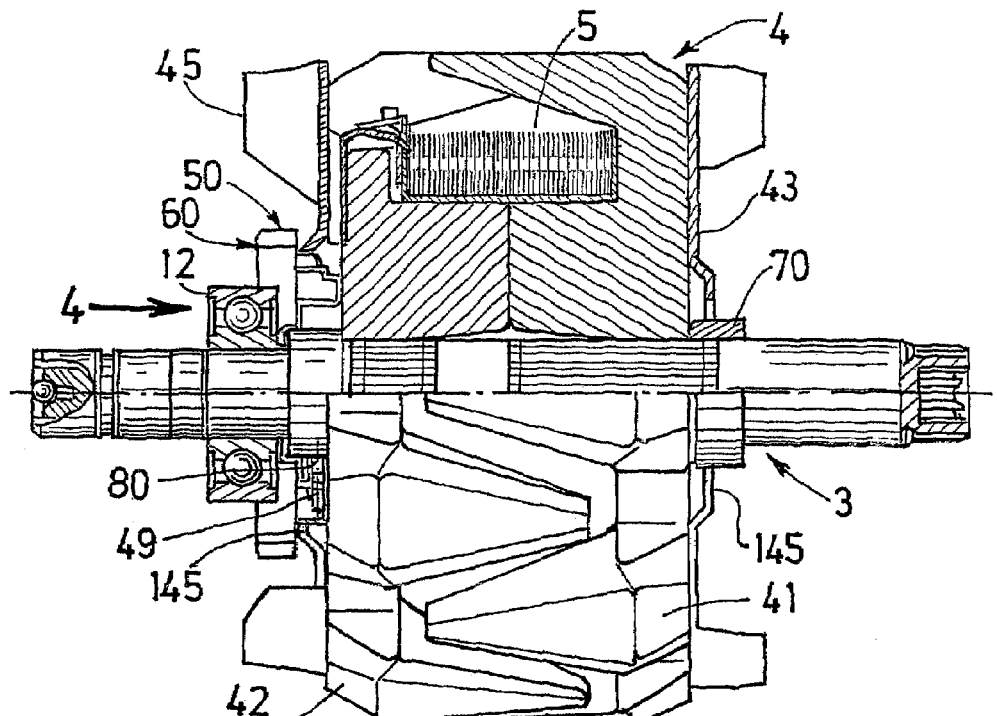
FIG. 3 is a view which is partially sectioned in order to show the excitation winding of the rotor/shaft assembly.

The same is true for the composition of the rotor 4, which includes two magnet wheels with mounting teeth 41, 42, fixed onto the shaft 3 by virtue of milled portions, which the shaft locally features for this purpose (FIG. 3). These wheels each feature a transverse flange carrying, at its outer periphery, axially-oriented teeth 143 turned towards the other flange.

The teeth 143 are substantially parallel to the axis of the rotor 4. The teeth 143 of a magnet wheel are offset in angle with respect to the teeth of the other magnet wheel in such a way that the teeth of the two magnet wheels penetrate into each other therefore being imbricated with one another.

With the winding 5 of the rotor 4 being provided with direct current, the teeth of one of the magnet wheels define North poles, while the teeth of the other magnet wheel define South poles. The excitation rotor 4 is thus magnetised.

Pairs of North/South poles have then been created. In electrical-generator mode, the crossing movement of the teeth in front of the poles of the stator, by the rotation of the stator, creates an alternating current in the winding of the rotor. This current is rectified by a bridge.

The winding 5 is mounted in a support in the form of an annular-shaped coil (not referenced) featuring a U-shape in cross-section. For the mounting of the coil and of its winding, each magnet wheel 41, 42 features an annular sleeve at its inner periphery. The sleeves are turned towards one another. The teeth 143 of one magnet wheel are separated from one another by notches. Seen from above, the teeth have a trapezoidal shape.

In a variant, as described in the patent U.S. Pat. No. 5,747,913, permanent magnets can be installed in the region of the teeth 143 which, in all cases, surround the winding 5.

The wheels 41, 42 are holed for the shaft 3 to pass through by force. More precisely, the shaft 3 is harder than the wheels 41, 42 for fixing of them by its milled portions.

This shaft 3 extends on either side of the rotor 4 and forms a subassembly with it.

The magnet wheels, by way of their flange, each carry a fan 43, 44 with blades 45, here fixed by electric welding.

In a variant the front fan 43 is dispensed with, this fan 43 being less powerful than the rear fan 44.

The shaft 3, via its front end, passes through a front bearing 11, while, by its rear end, it passes through a rear bearing 12 of smaller size than the bearing 11.

The shaft 3 is force-fitted into the inner rings of the bearings 11 and 12, the outer rings of which are integral respectively with a first support 13 and with a second support 14. These supports 13, 14 are usually called front end plate 13 and rear end plate 14 respectively. They are made of a material which can be moulded, here aluminium-based. These supports 13, 14 are pierced as can be seen better in FIGS. 1 and 7 in order to allow a circulation of air amplified by the fans 43, 44, and to allow the machine to be cooled.

They have a hollow shape and each feature a backplane which is holed centrally for the shaft 3 to pass through, the said backplane being of transverse orientation and featuring a shouldered housing centrally for the mounting and the axial locking, in one direction, of the outer ring respectively of the bearing 11 and of the bearing 12 which are thus carried fixedly. The outer ring of the bearing 11 is force-fitted into the housing of the front end plate 13.

At their outer periphery the backplanes, forming webs, of the end plates each carry an annular rim of axial orientation. The rims are upturned axially towards one another and are fixed to one another by a plurality of screws (not referenced) here in the form of tie rods as visible in FIG. 1. The length of the rims depends on the application.

Figure 7:
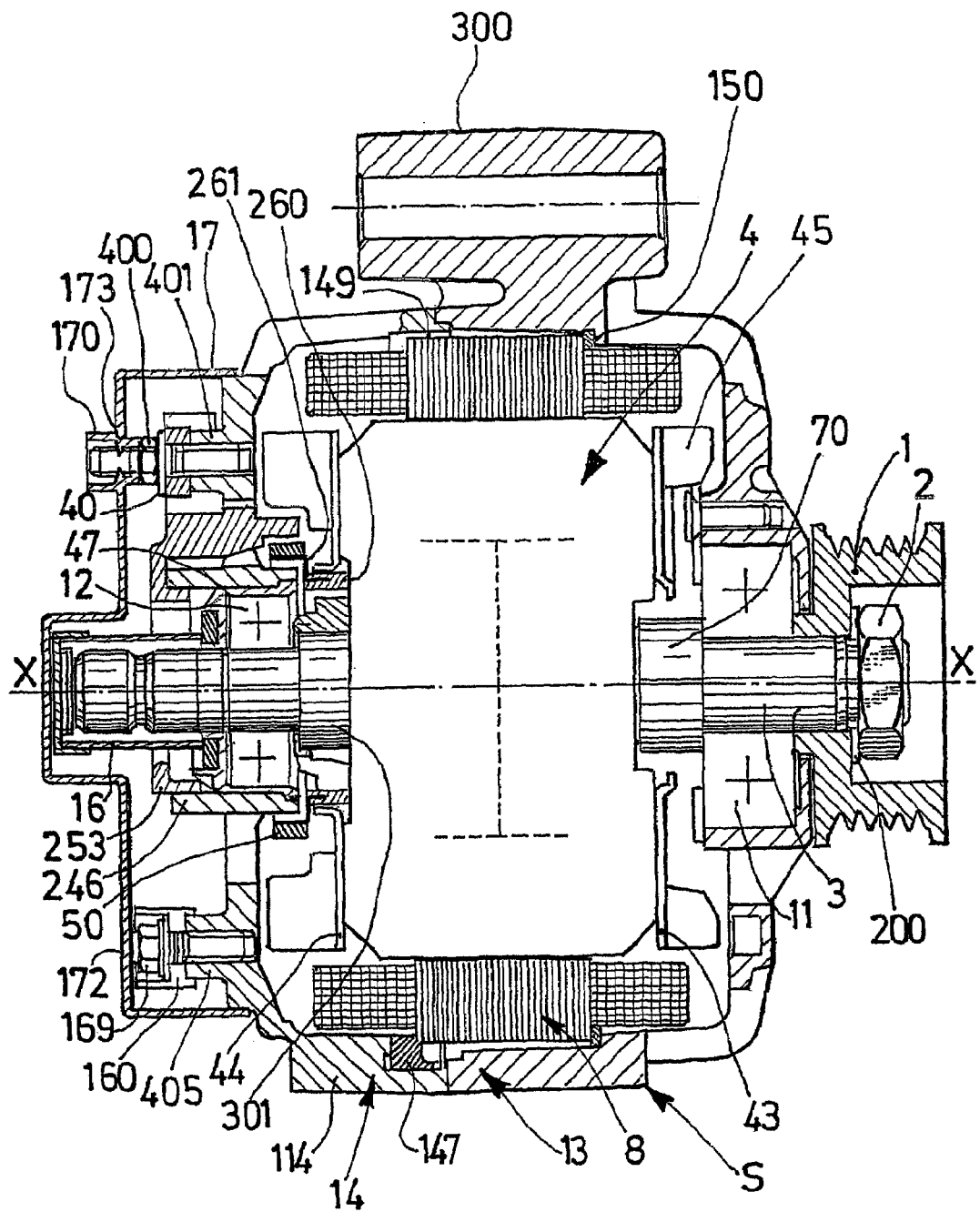
FIG. 7 is a view similar to FIG. 1 for yet another embodiment example, the rotor being represented by its contour.

The rims are stepped internally in diameter and thus each internally feature, at their free end, an end portion of larger internal diameter delimited axially by a shoulder formed by virtue of the change in internal diameter of the said rim. A space exists here between the two rims. In a variant the rims are contiguous. In FIG. 1, the stator 8 is force-fitted into the free ends of the rims, being locked axially by the shoulders of the said rims; the screws for fixing the rims thus also make it possible to clamp the stator 8 forming a spacer, in FIG. 1, between the two rims of the end plates 13, 14. In FIG. 7 the rims are contiguous.

The front end plate 13 carries lugs for fixing it to a fixed part of the vehicle and for tensioning the belt. One of these lugs, in this instance a lug for fixing to a fixed part of the motor vehicle, can be seen at 300 in FIG. 7.

In a variant, each end plate 13, 14, at least in the region of its peripheral rim, features a fluid-circulation channel in its thickness for cooling the machine such that the presence of the fans is not vital; nevertheless the backplanes of the end plates are still pierced.

In a variant, one of the two end plates lacks any rim and forms a cover for the other end plate equipped, in a variant, internally with a fluid-circulation channel.

The cooling channel or channels can be connected into the cooling circuit of the vehicle.

Needless to say, it is possible to combine this type of cooling with the presence of one or of two axially-acting fans rotating as one with the rotor as described, for example, in the document FR01 01526 filed on 5 Feb. 2001.

All the combinations can be envisaged. In any case, the end plates 13, 14 linked together belong to a hollow support S equipped with a front end plate 13 and with a rear end plate 14 linked together and each centrally possessing a bearing means 11, 12 such as a ball bearing, traversed by the shaft 3.

It emerges from the foregoing, going axially from right to left on FIG. 1, that the machine features a shaft 3 with a threaded end for mounting of the pulley 1, a front end plate 13 with its central bearing 11 for rotary mounting of the front end of the shaft 3, a washer (not referenced) for axial retention of the outer ring of the bearing 11, in the other direction, a spacer washer 70, the stator 8 surrounding the rotor 4, a target 50 carried by a target holder (described below), the rear end plate 14 with its central bearing 12 for rotary mounting of the rear end of the shaft 3, a brush holder 16 fixed to the rear face of the rear end plate 14 turned away from the rotor 4 and a cap 17 also fixed to the rear face of the rear end plate 14.

The fans 43, 44 are carried by the faces of the magnet wheels 41, 42 which are turned towards the backplanes of the end plates 13, 14.

It will be noted that the pulley 1 includes, at the rear, a bush (not referenced) for contact with the inner rim of the bearing 11 and that the nut 2 makes it possible to clamp the pulley 1 in contact with the inner ring of the bearing 11. This inner ring is clamped between the bush of the pulley and the ring-shaped spacer.

In practice the bearing 12 its carried by the shaft 3, as well as the spacer ring fixed to the shaft 3 by virtue of a milling of the said shaft.

Here the rear end plate 14 features an annular housing delimited by a wall of transverse orientation and a bush 46 of axial orientation. The same goes for the housing of the front end plate. The bushes here are machined internally.

In this housing is mounted a ring made of plastic 47 attached by clipping into it as can be seen better in FIG. 7. Thus the ring 47, at its front end, features protrusions engaged in recesses of the bush. The outer ring of the bearing 12 is mounted in this housing without being retained axially.

In a conventional alternator a spacer washer is mounted between the rear fan 44 and the inner ring of the bearing 12.

Here this ring is replaced by a target-holder piece 60 carrying, fixedly, a target 50 with axial or radial reading. The target here is magnetic and, for example, includes an alternating series of South and North poles distributed regularly.

The target holder 60 here is a piece made of stamped sheet metal, such that it is of a magnetic nature.

In a variant, the target holder 60 is a moulded plastic piece and is then of a non-magnetic nature.

The target holder 60 is adjacent to the backplane of the rear end plate 14 and is locked in rotation onto the rotor 4. This locking is preferably achieved by a shape-interlocking link.

In FIG. 1 the target holder is locked in rotation indirectly to the rotor by the use of the fan 44 here fixed onto the magnet wheel 42. This arrangement makes it possible not to modify the rotor.

The fan 44 is also not modified, since it, in the standard way, features two notches 48 at its inner periphery forming an indexing device for fixing the fan in the correct angular position with respect to the teeth 143 of the associated magnet wheel 42.

The fan 44 is made of stamped sheet metal and, at its outer periphery, features blades 45 and, at its inner periphery, a transverse rim 145 offset axially towards the bearing 12.

It is in this rim that the notches 48 are formed.

Figure 4:
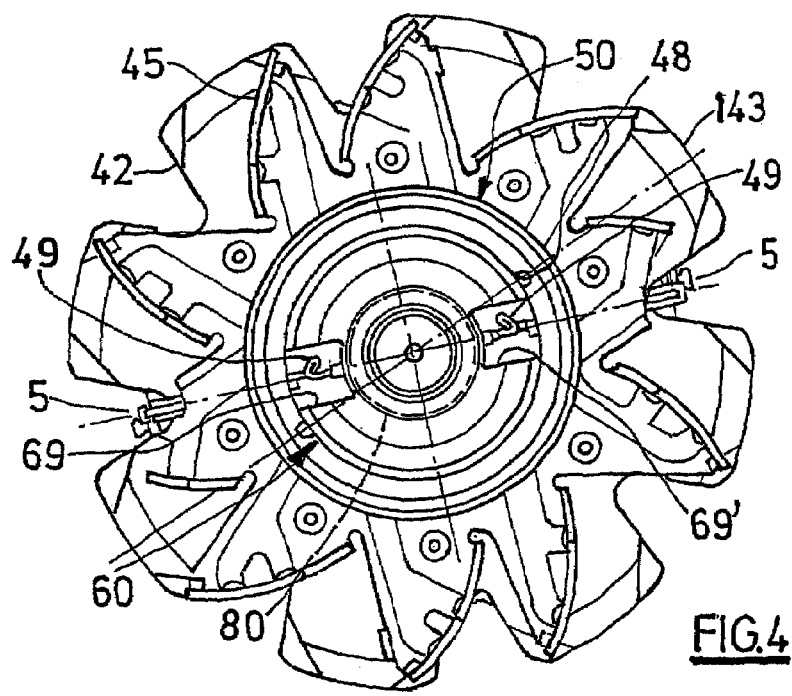
FIG. 4 is a view along the arrow of FIG. 3.

In FIG. 4 are seen the wire links with the ends of the winding 5. These links a diametrally opposite and each pass through a clearance between two teeth of the magnet wheel 42.

Next this link passes between the flange of the magnet wheel 42, locally recessed for this purpose, and the fan 44 so as to terminate in a straight-line portion engaged in a loop respectively 49, 49' belonging to a device 80 for connection with the tracks 6, 7.

The ends of the wire links of the winding 5 are welded, here electrically, with the loops 49, 49', the device 80 including an electrical insulation block 61.

The target holder 60 is of hollow, annular shape. At its outer periphery it features an outer annular rim 62, 63 of axial orientation and stepped in diameter. The portion of largest diameter 63 extends partly radially above the bush 46, turned towards the rotor 4, of the rear end plate 14 and therefore also of the outer ring of the bearing.

In the portion of smallest diameter 62 are formed, in radial projection by stamping, two diametrally opposed studs 64 each penetrating in a complementary way into a notch 48, here semi-circular.

The studs 64 are of axial orientation and of semi-circular shape in cross-section. The axial length of the studs 64 makes it possible to cope with manufacturing tolerances.

The portion is connected to a stepped backplane 65 of transverse orientation overall.

The backplane 65 is connected at its outer periphery to the portion 62 and at its inner periphery to an inner annular rim 66 of axial orientation stepped in diameter like the outer rim. The outer and inner rims are therefore in the shape of a stepped bush.

The rim 66 is shorter axially than the outer rim 62, 63. Each rim 62, 63 and 66 features, at its free end, a stiffening collar 67 and 68 respectively turned radially outwards and radially inwards respectively. The collar 68 is intended to come to bear against the inner ring of the bearing 12, while the collar 67 is adjacent to the backplane of the rear end plate 14, a clearance existing.

The portion 62 and the stepped backplane 65 pass through the transverse rim 145 of the annular-shaped and centrally holed fan 44. The backplane is able to come to bear on the rotor 4.

The target holder 60 forms an axial spacer between the rotor 4 and the inner ring of the bearing 12 in such a way that it is locked axially with assembly clearance and does not risk interfering with the end plate 14, the length of the outer rim 62, 63 being determined as a consequence and dependent on the applications.

Opposing windows 69, 69' are formed in the backplane 65 of the target holder. These windows allow access to the loops 49, 49' and thus allow welding with the ends of the winding 5.

The backplane 65 is therefore also a backplane for protection during the welding operation in the region of the loops 49, 49'.

The target 50 here includes a number of pairs of magnetic poles which are identical to that of the rotor 4.

The nature of the material constituting the target may be ferrites, rear earths or include only inert sectors made of magnetic sheet metal in which a flux is set up by the magnetic field of the rotor.

Facing the target 50 are installed three sensors 52, here, since the machine is of the three-phase type, in a variant, more than three sensors, carried by a sensor holder 53 fixed to the backplane of the rear end plate 14, more precisely onto the face of it which is turned away from the target 50 and from the target holder 60.

The magnetic target 50 is fixed onto the portion 63 of larger diameter of the target holder 60 and is at its free end adjacent to the backplane of the rear end plate 14.

The sensors 52 are of magnetic nature. These, in a first embodiment, are Hall-effect sensors, in a variant magneto-resistive sensors the resistance of which varies as a function of the magnetic flux.

The sensors 52 are installed radially above the target 50 with a gap being defined between the sensors and the target in such a way that the reading is radial. As will have been understood, the target 50/sensor 52 assembly constitutes a means for tracking the rotation of the rotor of the magnetic type, which does not risk being dirtied due, on the one hand, to the ventilation created by the fan 44.

This ventilation is due to the fact that the end plates 13 and 14 are pierced in the region of their backplane and of their rim.

The holes formed in the backplane of the rear end plate 14 have been marked as 54 in FIG. 1.

The sensor holder 53, here made of plastic, features portions 55 of axial orientation. These portions 55 pass through the end plate 14 by virtue, here, of a hole 54. The sensors 52 are joined with the portions 55 and are installed radially between the target 50 and the blades 45, being very close to the target 50.

The electrical connections of the sensors 52 are housed in the sensor holder 53 fixed with the aid of two lugs 56 onto the backplane of the rear end plate 14 on the side opposite the target 50 and the rotor 4.

The holes of the lugs 56 are of oblong shape in order for fixing bolts 57 to pass through to the backplane of the end plate 14.

Likewise, the brush holder 16 is fixed onto the same face of the backplane of the end plate 14 by the use of bolts and of lugs which are not referenced.

The brush holder 16, in a known way, includes two cages for guiding brushes, each interacting with a collector ring 6, 7 attached to the rear end of the shaft 3 and each connected to one of the loops 49, 49'. The brushes are subjected to the action of springs housed in the cages.

The outlets 10 of the phases of the stator 8 are integral with a piece 59 also fixed onto the rear end plate by the use of lugs and of bolts which are not referenced. Connections are provided for each phase 10.

In FIG. 7, the brush holder 16 and the outlets of the phases belong to one and the same piece.

In FIG. 2 is seen the circumferential distribution of the electrically insulating pieces 53, 16, 59.

It will be noted that the sensor holder 53 is adjustable circumferentially.

Thus the space available is occupied optimally, while having protection by the cap 17 and good aeration.

Here, the sensor holder 53 is adjustable in angle or circumferentially and features an appendage turned radially towards the inside in order to carry the three portions 55 and the three sensors 52, the hole 54 being of large size.

More precisely, the passage hole 54 of one axial portions 55 is of a larger size than the other holes as can be seen in FIG. 2.

Advantageously, the portions 55 are linked together so as to form a single sector.

Needless to say, the ends of the phases 10, and the pieces 16, 58 can be connected to an electronic control and monitoring module, as described, for example, in the documents FR-A-2 745 444 and EP-A-0 260 176 to which reference may be made for further details. In the light of these documents it is seen that the sensors, for example Hall-effect sensors, are threshold types, in one embodiment. This module is installed outside the machine. In a variant, it may be installed on the rims of the end plates 13, 14.

The electronic module includes switches such as MOSFET transistors and includes control means for synchronously controlling the phases of the stator, for example with the aid of square-wave signals, in a variant sinusoidal or trapezoidal-shaped signals.

The electronic control and monitoring module is a management unit which includes a computer and receives information originating from the sensors. This unit also includes the abovementioned switches belonging to the rectifier bridge linked to the various phases of the armature and mounted between earth and the positive terminal of the battery. Each switch is associated in parallel with a diode making it possible to rectify the alternating current into direct current when the machine is operating as an electrical generator. The voltage-regulator device is also mounted in this module.

For further details, refer to the abovementioned documents, the phases of the machine being, for example, mounted in star mode as can be seen, for example, in FIGS. 4 and 12 to 14 of the document EP-A-0 260 176.

In summary, the switches connected in parallel with the diodes of the rectifier bridge are controlled from an electronic assembly, comprising a computer, which receives information on the angular position of the rotor via the sensors.

When the machine is operating in electric-motor mode, the phases are fed sequentially.

For further details, refer, for example, to the document EP-A-0 260 176.

The tracking means of the invention are able to be linked to these control means in order to make the machine work as an electric motor and to cause the engine of the vehicle to start.

Needless to say, it is possible to stop the engine at red lights so as to restart later and save fuel, the management unit being configured as a consequence.

In a variant, the machine may work as an auxiliary motor when the engine of the vehicle is stopped, in order to drive an accessory.

In the figures, the reading of the magnetic target 50 is a radial reading. In a variant, by virtue of the hole, the reading can be axial, the sensors 52 being installed axially face-to-face with the target 50, that is to say opposite the edge face thereof.

It will be appreciated that radial reading is more precise than axial reading of the target.

The target 50 here is fixed by bonding onto the portion 63 of the target holder. In a variant, it can be overmoulded onto the target holder 60. This target 50 is protected since it is installed between the opposing side faces of the end plate 14 and of the rotor 4, the said faces belonging respectively to the backplane of the end plate 14 and to the flange of the magnet wheel 42.

In a variant, the target holder 60 can be installed between the backplane of the front end plate 13 and the flange of the magnet wheel 41 in place of the spacer 70. The sensor holder 53 is then fixed onto the face of the end plate 13 which is turned away from the rotor.

In a variant, the rotor 4 may include projecting poles, a winding being associated with each of then. It may include two pairs of magnet wheels with an excitation winding.

In a variant, the rotor may include permanent magnets and separate windings.

The rotor may therefore be of any form.

In the same way, it can be envisaged that the bearings 11 and 12 may be replaced by other types of bearings, for example journal bearings.

In all cases, the target/target holder assembly belongs to the rotor 4/shaft 3/bearing 12 assembly.

In a variant, the structures may be inverted, the fan 43 or 44 including projections, such as studs, engaged in recesses, such as notches, formed in the target holder.

At least one protrusion is provided, the number of protrusions possibly being greater than two.

As emerges from the drawings, the stepped features of the target holder 60 are due to the presence of the surrounding pieces in order to occupy the space optimally.

Needless to say, it is possible to over-excite the winding 5 of the rotor 4 when the machine is operating as an electric motor (starter mode) in order to maximise the starting torque of the alternator/starter.

This over-excitation may be also be applied when the machine is operating as an electrical generator (alternator mode). The accessory driven when the machine is operating as an auxiliary motor may be the compressor of the air-conditioning device or an assistance pump for power-assisted hydraulic steering. For further details, refer to the document FR01 01341 filed on 31 Jan. 2001, describing all the possible strategies.

Needless to say, as described in the document FR00 16738 filed on 21 Dec. 2000, the rotating electric machine may include more than three phases.

Each phase may include several windings. The electrically conducting elements may consist of bars advantageously of rectangular section; the inputs of the phases being linked together by a linking piece in the form of a small bar. For further details, refer to this document.

The distribution of the magnetic poles on the target may not be symmetrical. This is because, when the winding 5 of the rotor 4 is activated, that creates a magnetic field in such a way that that has an influence on the means, of the magnetic type, for tracking the rotation of the rotor. The asymmetry of the distribution of the magnetic poles of the target makes it possible to re-establish symmetry for the triggering of the threshold-type sensors.

Thus, depending on application, the North and South magnetic poles have a larger circumferential extent than the other South or North magnetic poles. This difference in circumferential extent of the poles depends on the excitation of the winding 5.

In all cases, the magnetic target possesses asymmetric North and South poles.

Needless to say, the present invention is not limited to the embodiment examples described.

Thus, in one embodiment, centring means act between the sensor holder and its associated end plate in order to obtain a precise gap between the target and the associated sensors.

Thus precise reading and precise information are obtained on the part of the sensors.

The sensor holder is therefore configured to come into intimate contact with the end plate in question.

In one embodiment, the end plate in question centrally features a bush, which is extended so as to interact with a rim of axial orientation arising from the sensor holder.

More precisely, in the embodiment of FIG. 7, the bush referenced as 246 is extended rearwards towards the cap 17 with pierced backplane.

The sensor holder 53, at the rear, features an annular rim of axial orientation 253 penetrating into the rear end of the bush 246. The rim 253 is therefore directed axially with the bearing 12 supported by the bush 246 with the plastic ring 47 being interposed.

The rim 253 is in intimate contact via its outer periphery with the inner periphery of the bush 246 advantageously machined in the region of the rear extremity thereof.

Here, the rim 253 is in local contact with the inner periphery of the bush 246 in order to obtain even more precise centring of the sensor holder 53.

This sensor holder 53 here (FIG. 9) features a rim 253 extending circumferentially over less than 360° with three projecting regions 254, 255, 256 for local contact with the rear end of the bush 246.

Here, the rim 253 extends circumferentially over more than 180°. All this depends on the application, and more precisely on the presence of the brush holder 16 projecting radially inwards towards the X-X axis as can be seen better in FIG. 8.

The rim 253 is therefore shaped circumferentially so as not to interfere with the brush holder 16, knowing that the sensor holder 253 is adjustable in angle or circumferentially by virtue of the lugs 56 each equipped with an oblong-shaped aperture 156 allowing circumferential adjustment.

Figure 9:
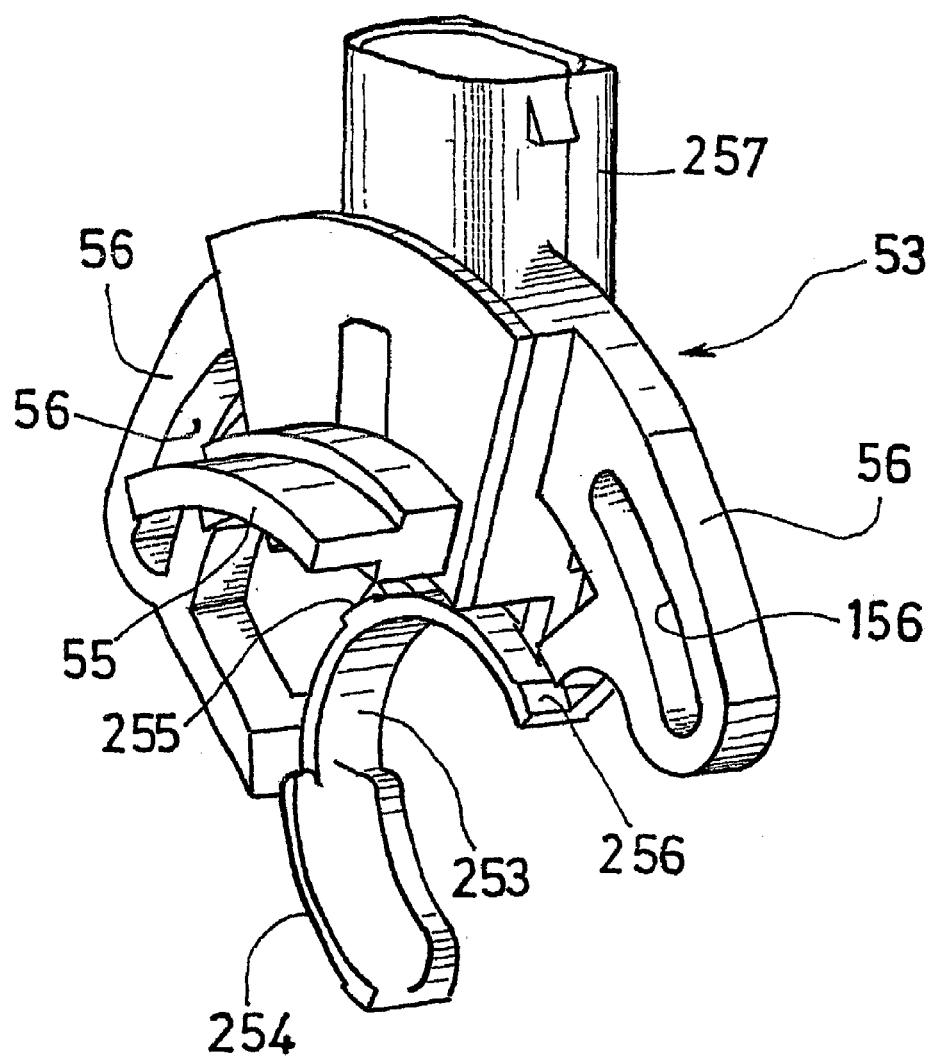
FIG. 9 is a view in perspective of the sensor holder of FIGS. 7 and 8.

In FIG. 9, the sensor holder 53 is made of plastic, which can be moulded, as in FIG. 2, and the portions 55 here belong to the same angular sector 55 passing through the aperture 54 produced in the backplane of the rear end plate.

This aperture is of greater circumferential extent than the sector 55, in which the sensors are embedded.

The sensors 55 are installed radially above the magnetic target 50 with a precise gap being defined, by virtue of the bush 246 and the portions 254 to 256, between the outer periphery of the target 50 and the inner periphery of the angular sector 55, the target here being a radial-reading target.

In a general way, greater precision is obtained with a radial-reading target than with an axial-reading target.

Figure 8:
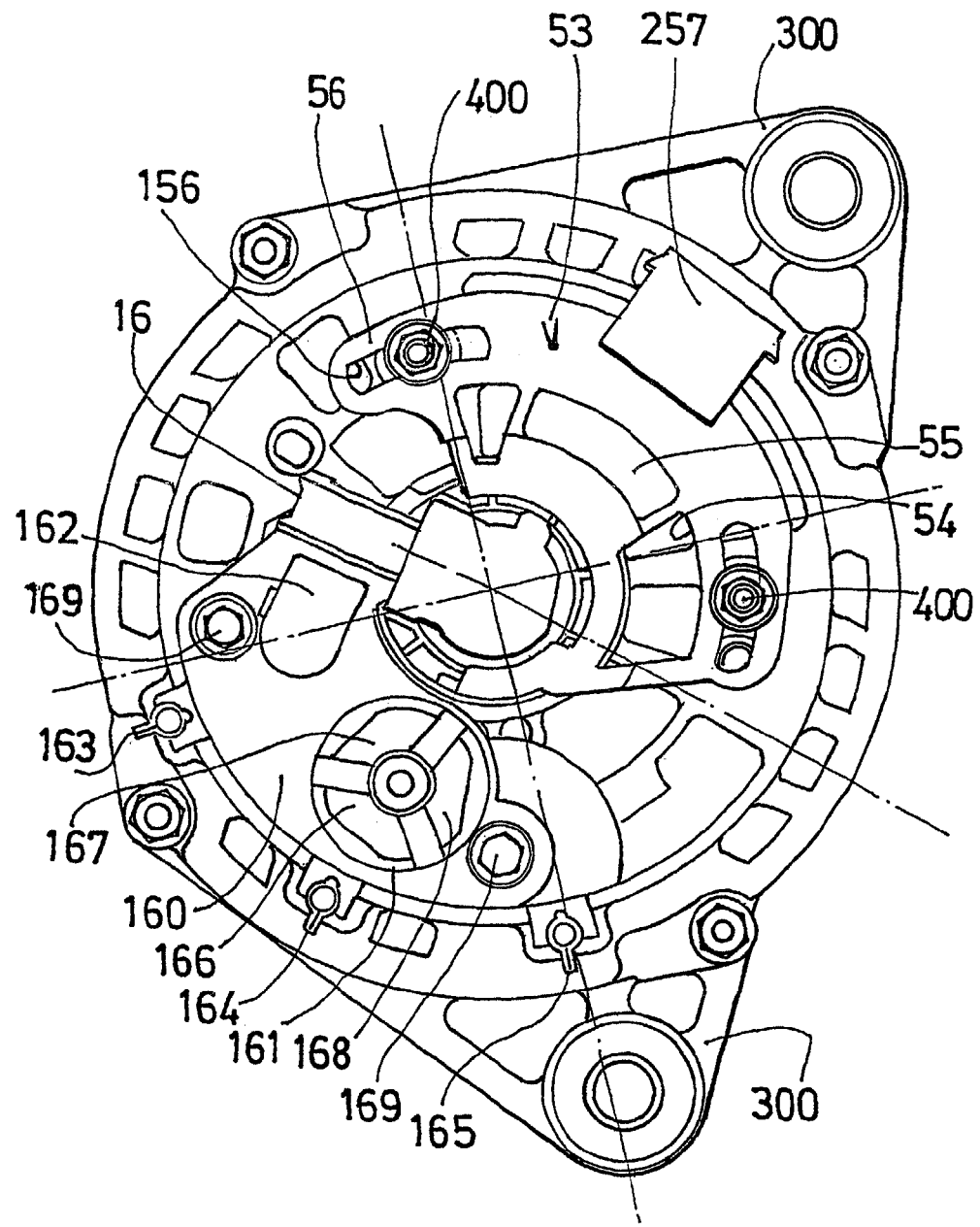
FIG. 8 is a view of the rear face of the machine of FIG. 7 without the protective cover in order better to show the pieces carried by the rear end plate.

The sensor holder, at its outer periphery, features a connector 257 passing through the axially-oriented annular rim of the cap 17, equipped for this purpose with an oblong-shaped aperture. The sensor holder 53 is equipped with holes on either side of the sector 55 as can be seen in FIGS. 8 and 9. The holes extend below the apertures 156.

This sensor holder 53 has an asymmetric shape at its inner periphery in order not to interfere with the brush holder 16 and to make best use of the available space circumferentially.

Here, the brush holder 16 is of the type described in the patent application FR01 00931 filed on 24 Jan. 2001.

Thus, the brush holder 16 belongs to a support 160 equipped with a first subassembly 161 belonging to a connector for forming an electrical connection via a second subassembly, electrical cables and a second connector with the electronic control and monitoring module including a box enclosing the components of the said module.

The sensors of the sensor holder are linked via the connector 257 and another connection device, which is not visible, to the electronic control and monitoring module.

The brush holder 16 also includes a connector 162 for linking the brushes to the electronic control and monitoring module via a third connection device.

The support 160 is therefore made of electrically insulating material.

In this support are embedded the strips of electrically conducting material linking the inlets of the outlets 163 to 165 of the phases of the stator 8 to the first contact regions 166 to 168 of the first subassembly 161. These regions belong to a protuberance of the support 160 as described in this document FR01 00931, strips of material separating the contact regions from one another, with electrical isolation, the second of the connector features a casing delimited by a box and a closing cover. This casing encloses second electrically conducting elements mounted flexibly within the casing and featuring two second contact regions matching the regions 166 to 168 as described in the above-mentioned document FR01 00931 to which reference can be made for further details, the support 160 being fixed to the rear end plate by screws 169 by virtue of studs of the rear end plate 14 and of spacer rods arising from the support 160.

By virtue of the clearances which the sensor holder 53 features in the region of the brush holder 16, of the lugs 56 and of the rim 253, it is possible to adjust the sensor holder 53 circumferentially without risk of interference with the support 160. In all cases, the sensor holder features oblong apertures for fixing it, with angular adjustment, to the end plate in question, here with the aid of a fixing member in a way described below.

It will be appreciated that the space available in the region of the rear end plate 14 is occupied optimally, the holes of the sensor holder 53 and of the rear end plate promoting ventilation.

It will be noted that the stator 8 is mounted elastically in the support S as described in the application FR00 13527 filed on 6 Oct. 2000.

More precisely, four buffers 147 with positioning tabs 148 are put in place radially between the stator 8 and the axially-oriented outer peripheral rim 114 of the rear end plate 14.

The buffers here are distributed regularly, circumferentially.

These buffers, with square-shaped cross-section, act axially and radially between the abovementioned rim 114 of the end plate 14 and the rear end of the pack of metal plates of the stator 8 constituting the body thereof.

To do that, the rim 114 features housings 115 for accommodating the positioning tabs 148 of the buffers 147.

Figure 11:
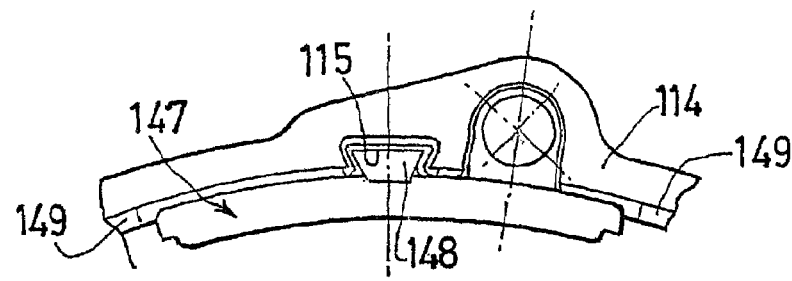
FIG. 11 is a view on a larger scale of the circled area of FIG. 10.
Figure 10:
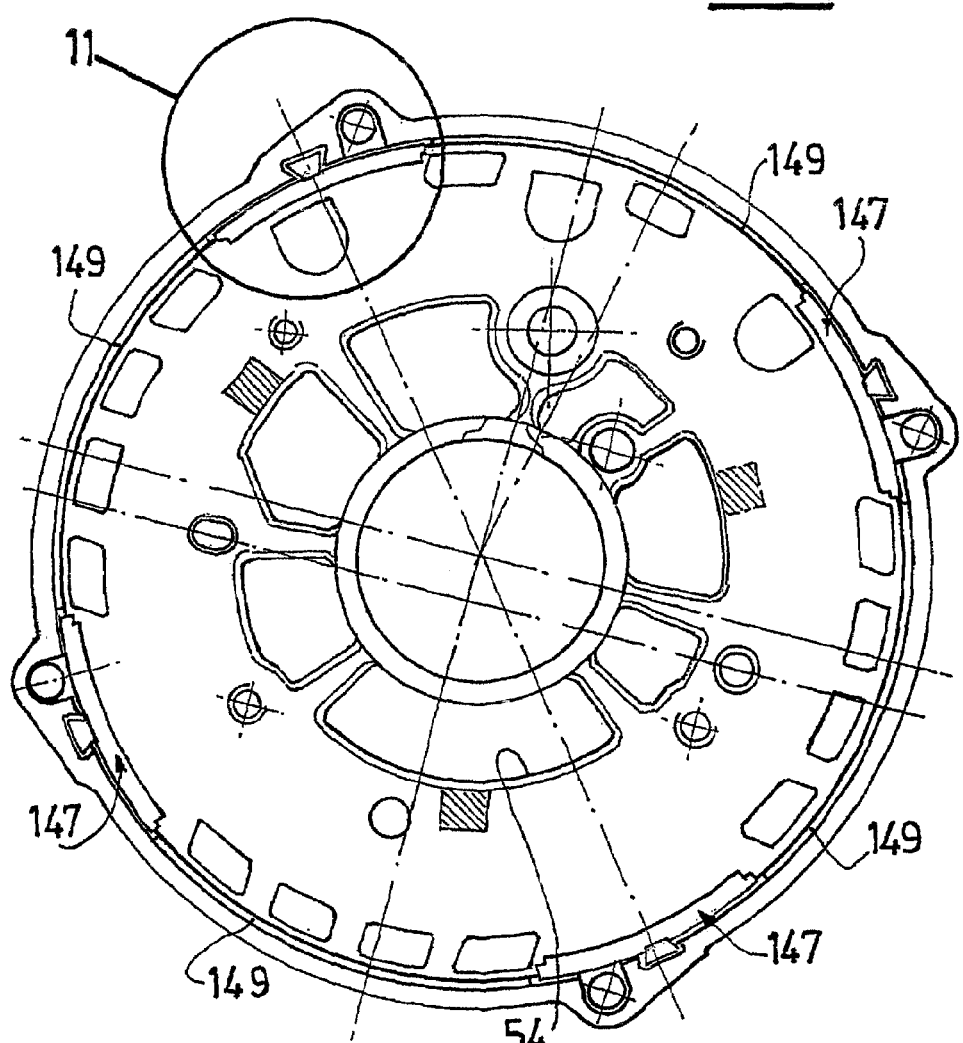
FIG. 10 is a view of the front face of the rear end plate without the stator.

The housings 115 have a dovetail shape complementary to that of the tabs. The free end of the rim 114 features reliefs which can be seen better in FIG. 11. An elastically deformable thermally conducting resin is interposed radially between the body of the stator 8 and the rim 114. More precisely, circumferentially, elastically deformable sectors made of thermally conducting resin 149 alternate circumferentially regularly with the buffers 147 by being interposed radially between the outer peripheral rim 114 of the rear end plate 14 and the body of the stator.

An elastically deformable, flat annular seal 150 is interposed axially between the front end plate 13 and the front end of the body of the stator 8 as can be seen better in FIG. 7.

It will be noted that the axially-oriented annular outer peripheral rim 113, which the front end plate features, carries the tabs 300.

The free ends of the rims 113, 114 are notched in such a way that the rims 113, 114 are stepped internally in diameter with transverse shoulders being formed for support of the buffers 147 and of the washer 150.

Thus a mechanical and vibratory decoupling of the stator 8 with respect to the rear end plate 14 carrying the sensor holder 53 is obtained, while, by virtue of the sectors 149, having good removal of the heat.

The vibrations of the sensor holder 53 are thus reduced as well as the transmission of heat such that the plastic sensor holder 53 is not stressed and that the precision of reading of the means for tracking the rotation of the rotor is enhanced.

By virtue of the sectors 149, the target holder 60 may be in two parts and, as can be seen in FIG. 7, include a shouldered plastic ring 260 locked axially onto the shaft 3 by virtue of a change in diameter 301 thereof. This ring includes a pierced backplane, of transverse orientation overall, extended at its outer periphery by an axially-oriented annular rim in which is anchored a staircase-shaped metal piece 261 carrying the magnetic target 50.

The rim of the ring 260 is overmoulded onto the axially-oriented base of the piece 261, the axially-oriented peak portion of which carries the target 50 and is connected to the said base by a transversely-oriented part.

The base and the peak portion are offset axially with respect to one another.

The rim of the ring 260 overall has an average diameter identical to that of the bush 246. Here, the average diameter of the said rim is slightly less than that of the bush 246 and the peak portion of the piece 261 extends radially above the bush (FIG. 7).

In a variant (FIG. 12) the target holder is of a single piece with the fan, forming an axially-oriented sleeve 60 at the inner periphery of the fan integral, for example by spot welding, with the rotor 4.

It will be noted that the brush holder 16 features, at its inner periphery, a tube which is open locally for the brushes to pass through, a seal (not referenced) being interposed between the front end of the inner tube of the brush holder and the ring 47 as can be seen in FIG. 7.

Here the rear end plate 14 features studs 401, 405, 406 for support of the sensor holder 53 and of the support 160 on the rear end plate, respectively. The studs 401 and 405 are tapped internally while the stud 406 features a piercing stepped internally in diameter for housing of the head and passage of the part of a fixing screw centrally passing through the first subassembly of the connector and especially the first regions 166 to 168 thereof for fixing the second subassembly of the connector as can be seen better in FIG. 2 of the abovementioned document FR01 00931.

The screw therefore features milling in the vicinity of its head for fixing the screw to the stud 406.

A nut bears via a washer on the cover of the second subassembly of the connector, being screwed onto the threaded part of the shank.

The studs 405 are tapped internally in order to receive the screws 169 for fixing the support 160 to the rear end slate 14.

The studs 401 are intended to receive alignment pins 400 including two threaded parts arranged on either side of a nut intended to come to bear on the lug 56 in question of the sensor holder 253 with the interposition of a bearing washer 407 between the nut of the alignment pin 400 and the lug 56. Each alignment pin 400 passes, by its front threaded part, through the oblong aperture 156; the washer 407 being wider than the aperture 156 in order to block the sensor holder 53 following the alignment pins 400 being screwed down.

It is for this reason that the stud 401 is tapped internally at 401' in order to receive the front threaded part of the alignment pins 400.

The rear threaded part of each alignment pin 400 is clipped into the cap 17 including, at the rear, risers 170 of transverse axial orientation of the cap 17.

Each riser 170, at its base for connecting to the transverse backplane 172, features an annular projection 173, possibly subdivided, intended to come into engagement with the rear threaded part of the alignment pin 400 in question.

Thus the cap 17 is mounted by clipping over the alignment pins 400, its projections 173 coming into engagement with the rear threadings of the alignment pins 400, knowing that the cap 17 is made of plastic. Each stud 401, like the other studs, features an upper face 402 for support of the sensor holder 53, more precisely of the lugs 56 thereof.

According to one characteristic, two low walls 403 arise in axial projection from the face 402, here by moulding. These low walls constitute a hollow projection and internally delimit a hole 404 each intended to receive the front threaded part of the alignment pin in question. A slot separates the walls from each other.

The hole 404 has the same axis of axial symmetry as the tapped part 401' of the stud 401. This hole 404 prolongs the tapped part 401', while being of larger internal diameter than that of the tapped part 401'. All these arrangements promote the automatic mounting of the alignment pins 400.

This is because they are made to engage in the holes 404 in such a way that they are pre-positioned and do not risk tilting. Next the alignment pins are screwed with the aid of a screwdriver.

It will be appreciated that the lateral edges of the low walls 403 are straight-line overall as can be seen better in FIG. 13, which makes it possible to achieve guidance of the lugs 56, the low walls penetrating into the oblong apertures 156, advantageously without protecting axially beyond the lugs. The low walls 403 are overall in circular-arc shape, therefore being housed in the thickness of the lugs 56. The low walls are centred on the axis of the tapped holes 401'. The straight-line lateral edges of the low walls make it possible to reduce the diametral size of the low walls and therefore not to enlarge the apertures 156.

Needless to say, this type of mounting with studs equipped with low walls is applicable to any piece for the support of one or more components carried by the end plate 14. This type of mounting can be applied to the support 59 of FIG. 1, the apertures then being circular and the fixing members screws.

The low walls of FIG. 14 allow circumferential adjustment of the sensor holder and closely follow the shape of the circumferential ends of the oblong apertures 156. In a variant, the low walls are linked together in order to form a bush.

The rear end plate here features hollows 411 on its rear face in order to lighten it.

It will be noted that the tabs 148 are circumferentially adjacent to the tapped holes provided for the screws or tie rods for fixing the end plates 13, 14 together.

A support surface 410 for the sensor holder 53 is provided between one of the hollows 411 and the hole 54, of greater circumferential extent than the other holes, of the end plate 14. The installation of the tracking means at the rear of the machine is favourable for connections.

Needless to say, the casing of the abovementioned connector participates in the fixing of the cap 17, in association with the risers 170.

In a variant, the centring of the sensor holder is achieved with the use of a pin arising from the sensor holder and engaged in a slot of the rear end plate, the pin interacting with the circumferential edges of the groove. Centring means therefore advantageously exist between the sensor holder and its associated end plate.

The invention claimed is:

1. Multi-phase rotating electric machine adapted to be used in a motor vehicle, having an internal-combustion engine, as an electrical generator and as an electric motor for starting of the internal-combustion engine, comprising:
    a hollow support (S) equipped with a front end plate (13) and with a rear end plate (14),
    a multi-phase stator (8) carried internally by the hollow support (S),
    a rotor (4) surrounded by the multi-phase stator (8),
    a shaft (3) carrying the rotor (4),
    means (50, 52) of the magnetic type for tracking the rotation of the rotor, said means (50,52) of the magnetic type comprises a target holder (60) locked in rotation onto the rotor (4) and mounted adjacent thereto, wherein said rotor (4) comprises magnetic poles, each of said front (13) and rear (14) end plates comprises bearing means (11,12) traversed by the end of the shaft (3),
    a target (50) fixed onto the target holder (60) and at least one sensor (52) associated with the target (50) for detecting the passing of the magnetic target (50), said target (50) is installed axially between the rotor (4) and one of the front (13) and rear (14) end plates, said one of the front (13) and rear (14) end plates is adjacent to the target holder (60) and carries the sensor (52),
    wherein said at least sensor (52) is mounted on a sensor holder (53) fixed to said one of the front (13) and rear (14) end plates on the side opposite to the rotor (4),
    wherein the sensor holder (53) features oblong apertures receiving and fixing said at least one sensor (52) with angular adjustment to said one of the front (13) and rear (14) end plates on the side opposite to the rotor (4).

2. Electric machine according to claim 1, wherein said at least sensor (52) pass through said aperture of said one of the front (13) and rear (14) end plates in such way the reading of the target is radial.

3. Electric machine according to claim 2, wherein said at least sensor (52) is installed radially above the target (50) and wherein a gap is defined between the sensor and the target.

4. Electric machine according to claim 2, wherein the means of the magnetic type comprise sensors (52), said sensor holder (53) features portions (55) of axial orientation, said sensors being attached to said portions (55).

5. Electric machine according to claim 4, wherein said portions (55) are linked together to form a single sector, said single sector passing through said aperture of said one of the front (13) and rear (14) end plates.

6. Electric machine according to claim 5, wherein said one of the front (13) and rear (14) end plates comprises holes, said aperture is a hole of a larger size than said holes and said aperture is of greater circumferential extend than said single sector.

7. Electric machine according to claim 6, wherein the sensor holder (53) is made of plastic material, said sensors are embedded in said single sector and the electrical connection of the sensors (52) are housed in the sensor holder (53).

8. Electric machine according to claim 1, wherein the target is a magnetic target and includes a number of pairs of magnetic poles which is substantially identical to that of the rotor (4).

9. Electric machine according to claim 1, wherein the sensor (52) is a Hall-effect sensor.

10. Electric machine according to claim 1, wherein the sensor (52) is a magneto-resistive sensor.

11. Electric machine according to claim 1, wherein at least three sensors (52) are provided.

12. Electric machine according to claim 1, wherein the sensor holder (53) features lugs (56) with oblong apertures (156) for fixing said sensor holder (53) to said end plate with angular adjustment.

13. Electric machine according to claim 1, wherein said one of the front (13) and rear (14) end plates features studs (401) for support of the sensor holder (53).

14. Electric machine according to claim 13, wherein each stud (401) comprise an upper face (402) for the support of the sensor holder (53) and a hollow projection (403).

15. Electric machine according to claim 14, wherein the hollow projection comprises walls (403), said walls penetrating into the oblong aperture (156) of the sensor holder (53) and delimit a tapped hole (404), said hole receiving a threaded pin (400) associated with a screw and a washer (407) for blocking the sensor holder (53).

16. Multi-phase rotating electric machine adapted to be used in a motor vehicle, having an internal-combustion engine, as an electrical generator and as an electric motor for starting of the internal-combustion engine, comprising:
a hollow support (S) equipped with a front end plate (13) and with a rear end plate (14),
a multi-phase stator (8) carried internally by the hollow support (S),
a rotor (4) surrounded by the multi-phase stator (8),
a shaft (3) canying the rotor (4),
means (50,52) of the magnetic type for tracking the rotation of the rotor, said means (50, 52) of the magnetic type comprises a target holder (60) locked in rotation onto the rotor (4) and mounted adjacent thereto, wherein said rotor (4) comprises magnetic poles, each of said front (13) and rear (14) end plates comprises bearing means (11,12) traversed by the end of the shaft (3),
a target (50) fixed onto the target holder (60) and at least one sensor (52) associated with the target (50) for detecting the passing of the magnetic target (50), said target (50) is installed axially between the rotor (4) and one of the front (13) and rear (14) end plates, said one of the front (13) and rear (14) end plates is adjacent to the target holder (60) and carries the sensor (52),
wherein said at least sensor (52) is mounted on a sensor holder (53) fixed to said one of the front (13) and rear (14) end plates on the side opposite to the rotor (4),
wherein the target holder (60) features, at its outer periphery, an outer annular rim (62, 63) of axial orientation and, at its inner periphery, an inner annular rim (66) of axial orientation axially shorter than the outer rim (62, 63).

17. Electric machine according to claim 16, wherein the outer rim (62, 63) is stepped in diameter and includes a portion of larger diameter (63) onto which the target (50) is fixed and a portion of smaller diameter (62) on which the stud (64) is formed in radial projection.

18. Electric machine according to claim 17, wherein the inner rim (66) is shaped to come to bear against the inner ring of a bearing (12) constituting the bearing means of said one of the front (13) and rear (14) end plates adjacent to the target holder (60).

19. Electric machine according to claim 18, wherein the inner rim (66) is stepped in diameter and wherein a stepped backplane (65) links together the outer (62, 63) and inner (66) rims.

20. Electric machine according to claim 19, wherein the stepped backplane (65) includes windows (69, 69').

21. Electric machine according to claim 1, wherein the target includes one of ferrites and rare earths.

22. Electric machine according to claim 1, wherein the target includes magnetic poles distributed asymmetrically.

23. Multi-phase rotating electric machine adapted to be used in a motor vehicle, having an internal-combustion engine, as an electrical generator and as an electric motor for starting of the internal-combustion engine, comprising:
a hollow support (S) equipped with a front end plate (13) and with a rear end plate (14),
a multi-phase stator (8) carried internally by the hollow support (S),
a rotor (4) surrounded by the multi-phase stator (8),
a shaft (3) carrying the rotor (4),
means (50, 52) of the magnetic type for tracking the rotation of the rotor, said means (50,52) of the magnetic type comprises a target holder (60) locked in rotation onto the rotor (4), wherein said rotor (4) comprises magnetic poles, each of said front (13) and rear (14) end plates comprises bearing means (11,12) traversed by the end of the shaft (3),
a target (50) fixed onto the target holder (60) and at least one sensor (52) associated with the target (50) for detecting the passing of the magnetic target (50), said target (50) is installed axially between the rotor (4) and one of the front (13) and rear (14) end plates, said one of the front (13) and rear (14) end plates is adjacent to the target holder (60) and carries the sensor (52),
wherein said at least sensor (52) is mounted on a sensor holder (53) fixed to said one of the front (13) and rear (14) end plates on the side opposite to the rotor (4),
wherein centring means exist between the sensor holder and its associated end plate (14),
wherein the end plate (14) associated with the sensor holder (53) features a bush (246) for mounting of the bearing means (11, 12) of said end plate (14) and wherein the sensor holder (53) features an axially-oriented rim (253) for intimate contact via its outer periphery with the inner periphery of the bush (246).

24. Electric machine according to claim 23, wherein said rim (253) is interrupted.

25. Electric machine according to claim 23, wherein said rim (253) is in local contact with the inner periphery of the bush (246).

26. Electric machine according to claim 25, wherein said rim is provided with projection regions (254, 255,256) for local contact with the bush.

27. Multi-phase rotating electric machine adapted to be used in a motor vehicle, having an internal-combustion engine, as an electrical generator and as an electric motor for starting of the internal-combustion engine, comprising:
a hollow support (S) equipped with a front end plate (13) and with a rear end plate (14),
a multi-phase stator (8) carried internally by the hollow support (S), a rotor (4) surrounded by the multi-phase stator (8), and a shaft (3) carrying the rotor (4), means (50, 52) of the magnetic type for tracking the rotation of the rotor, said means (50,52) of the magnetic type comprises a target holder (60) locked in rotation onto the rotor (4), wherein said rotor (4) comprises magnetic poles, each of said front (13) and rear (14) end plates comprises bearing means (11,12) traversed by the end of the shaft (3), a target (50) fixed onto the target holder (60) and at least one sensor (52) associated with the target (50) for detecting the passing of the magnetic target (50), said target (50) is installed axially between the rotor (4) and one of the front (13) and rear (14) end plates, said one of the front (13) and rear (14) end plates is adjacent to the target holder (60) and carries the sensor (52), wherein said at least sensor (52) is mounted on a sensor holder (53) fixed to said one of the front (13) and rear (14) end plates on the side opposite to the rotor (4), wherein the bearing means (12) of the rear end plate (14) is of smaller size than the bearing means (11) of the front end plate (13) and wherein said one of the front (13) and rear (14) end plates is the rear end plate (14), and wherein a fan (44) is fixed to the rotor (4), said fan carry blades (43) and said sensor holder (53) comprise at least a portion (55) of axial orientation and wherein said sensor is supported by said portion and is installed radially between the target (50) and the blades (45) of the fan (44).

28. Electric machine according to claim 27, wherein the rear end plate (14) is pierced for ventilation of the electric machine.

29. Electric machine according to claim 1, wherein the rotor (4) comprises two magnet wheels with mounting teeth (41, 42) and an excitation winding (5).

30. Electric machine according to claim 1, wherein the target holder (60) and the target (50) have an annular shape.

31. Multi-phase rotating electric machine able to be used in a motor vehicle, having an internal-combustion engine, as an electrical generator and as an electric motor for starting of the internal-combustion engine, comprising:

a hollow support (S) equipped with a front end plate (13) and with a rear end plate (14), a multi-phase stator (8) carried internally by the hollow support (S), a rotor (4) surrounded by the multi-phase stator (8), a shaft (3) carrying the rotor (4), means (50, 52) of the magnetic type for tracking the rotation of the rotor, wherein said rotor (4) comprises magnetic poles, each of said front (13) and rear (14) end plates comprises bearing means (11,12) traversed by the end of the shaft (3), said means (50,52) of the magnetic type comprises a target holder (60) locked in rotation onto the rotor (4), a target (50) fixed onto the target holder (60) and at least one sensor (52) associated with the target (50) for detecting the passing of the magnetic target (50), said target (50) is installed axially between the rotor (4) and one of the front (13) and rear (14) end plates, wherein said one of the front (13) and rear (14) end plates is adjacent to the target holder (60) and carries the sensor (52), and wherein the target holder (60) is linked in rotation by interlocking shapes to the rotor (4), wherein a fan (44) is fixed to the rotor (4), said target holder being linked by interlocking shapes to said fan (44).

32. Electric machine according to claim 31, wherein the target holder (60) comprises studs (64) and wherein the fan (44) features at least one notch (48) at its inner periphery into which are studs (64) arising from the target holder (60) penetrates in a complementary way.

33. Multi-phase rotating electric machine able to be used in a motor vehicle, having an internal-combustion engine, as an electrical generator and as an electric motor for starting of the internal-combustion engine, comprising:

a hollow support (S) equipped with a front end plate (13) and with a rear end plate (14), a multi-phase stator (8) carried internally by the hollow support (S), a rotor (4) surrounded by the multi-phase stator (8), a shaft (3) carrying the rotor (4), means (50, 52) of the magnetic type for tracking the rotation of the rotor, wherein said rotor (4) comprises magnetic poles, each of said front (13) and rear (14) end plates comprises bearing means (11, 12) traversed by the end of the shaft (3), said means (50,52) of the magnetic type comprises a target holder (60) locked in rotation onto the rotor (4), a target (50) fixed onto the target holder (60) and at least one sensor (52) associated with the target (50) for detecting the passing of the magnetic target (50), said target (50) is installed axially between the rotor (4) and one of the front (13) and rear (14) end plates, wherein said one of the front (13) and rear (14) end plates is adjacent to the target holder (60) and carries the sensor (52) and wherein the target holder (60) is of a single piece with a fan (44) fixed to the rotor, said target holder (60) forming an axially-oriented sleeve at the inner periphery of the fan.

34. Multi-phase rotating electric machine comprising:

a hollow support (S) equipped with a front end plate (13) and with a rear end plate (14), a multi-phase stator (8) carried internally by the hollow support (S), a rotor (4) surrounded by the multi-phase stator (8), a shaft (3) carrying the rotor (4), a magnetic device (50,52) for tracking the rotation of the rotor, said means (50,52) of the magnetic type comprises a target holder (60) locked in rotation onto the rotor (4), wherein said rotor (4) comprises magnetic poles, each of said front (13) and rear (14) end plates comprises bearing means (11,12) traversed by the end of the shaft (3), a target (50) fixed onto the target holder (60) and at least one sensor (52) associated with the target (50) for detecting the passing of the magnetic target (50), said target (50) is installed axially between the rotor (4) and one of the front (13) and rear (14) end plates, said one of the front (13) and rear (14) end plates is adjacent to the target holder (60) and carries the sensor (52), wherein said at least sensor (52) is mounted on a sensor holder (53) fixed to said one of the front (13) and rear (14) end plates on the side opposite to the rotor (4), said electric machine being functioning as an electrical generator and as an electric motor for starting of an internal-combustion engine in a motor vehicle.

35. Electric machine according to claim 1, wherein the target (50) is axially spaced from the rotor (4).

36. Electric machine according to claim 1, wherein said one of the front (13) and rear (14) end plates is provided with at least an aperture and wherein said at least sensor (52) penetrates at least in said aperture.

37. Electric machine according to claim 16, wherein the target (50) is axially spaced from the rotor (4).

38. Electric machine according to claim 33, wherein the target (50) is axially spaced from the rotor (4).

39. Electric machine according to claim 34, wherein the target (50) is axially spaced from the rotor (4).

* * * * *